United States Patent
Borodulin et al.

(10) Patent No.: US 6,672,550 B1
(45) Date of Patent: Jan. 6, 2004

(54) UNIVERSAL PAN AND POT LID HOLDER

(76) Inventors: German Borodulin, 583 46th Ave., San Francisco, CA (US) 94121; Alexander Shkolnik, 485 Dartmouth Ave., San Carlos, CA (US) 94070

(*) Notice: Subject to any disclaimer, the term of this patent is extended or adjusted under 35 U.S.C. 154(b) by 0 days.

(21) Appl. No.: 10/319,904

(22) Filed: Dec. 16, 2002

(51) Int. Cl.$^7$ .................. F16M 11/00; A47G 21/14; A47G 23/04
(52) U.S. Cl. .................. 248/176.1; 248/37.3; 248/146
(58) Field of Search .................. 248/176.1, 146, 248/37.6, 37.3; 211/41.11, 70.07, 70.7; 220/744

(56) References Cited

U.S. PATENT DOCUMENTS

| | | | |
|---|---|---|---|
| 1,885,788 A | * 11/1932 | Westburg | 248/500 |
| 4,790,503 A | * 12/1988 | Pohler | 248/176.2 |
| D320,332 S | * 10/1991 | Fetty | D7/638 |
| 5,127,616 A | 7/1992 | Carney | |
| 5,396,993 A | * 3/1995 | Spitler | 211/41.2 |
| 5,558,246 A | * 9/1996 | Ross, Jr. | 220/737 |
| 5,683,010 A | * 11/1997 | Boyajian, Jr. | 220/744 |
| D389,703 S | * 1/1998 | Marts | D7/601 |
| D397,000 S | * 8/1998 | Goodman et al. | D7/637 |
| D408,229 S | * 4/1999 | Hong | D7/638 |
| 5,979,673 A | * 11/1999 | Dooley | 211/41.11 |
| 6,012,593 A | * 1/2000 | Knittel et al. | 211/41.11 |
| 6,361,001 B1 | * 3/2002 | Durand | 248/146 |
| 6,361,004 B1 | * 3/2002 | Witherspoon | 248/213.2 |
| D468,163 S | * 1/2003 | Blake et al. | D7/601 |
| 6,585,200 B2 | * 7/2003 | Borodulin et al. | 248/176.1 |

FOREIGN PATENT DOCUMENTS

JP    H7-255598    1/1995

* cited by examiner

*Primary Examiner*—Ramon O. Ramirez
*Assistant Examiner*—Amy J. Sterling

(57) ABSTRACT

A universal pot and pan lid holder is composed of two cylindrical segments having through aligned circular slots and radial outward projections. The projection of one of the segments passes through the circular slot of the other segment and vise verse. The side edges of the cylindrical segments, which face each other, define an opening between them for access to the interior of the holder. In an assembled state of the segments they form a substantially cylindrical body with open ends and an access opening in the side of the body, so that the holder can rest on a support surface with its lower edge and provide the upper edge for temporary supporting pot or pan covers or lids during cooking. The diameter of the cylindrical body should be smaller than the diameter of the lids to be supported. The segments have recesses in the aforementioned projections for insertion of protruding portions formed on additional support member, so that this member can be inserted and stored together with the holder in a storage position, in which both segments are shifted with respect to each in a circular direction to a position of maximum overlapping and minimum space occupied by the device.

5 Claims, 9 Drawing Sheets

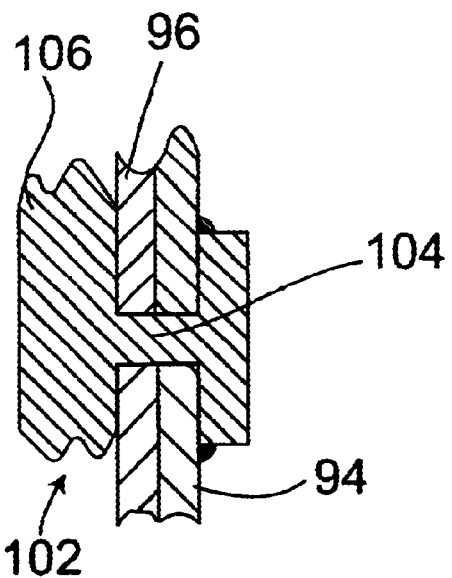
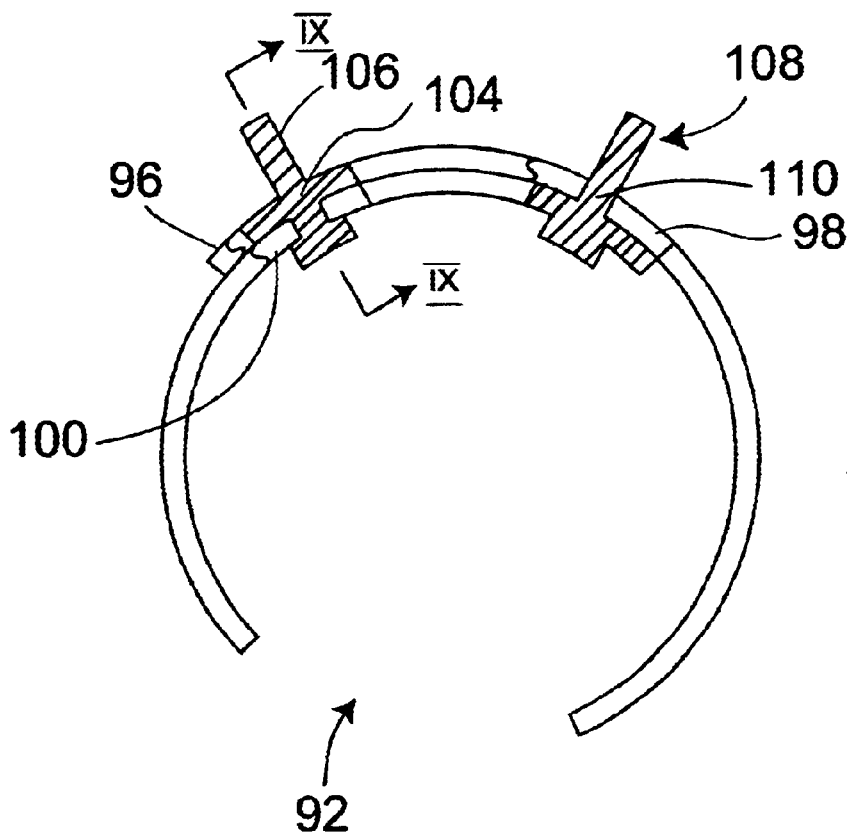

UNIVERSAL PAN AND POT LID HOLDER

FIELD OF THE INVENTION

The present invention relates to a pan, and pot lid holder, in particular to a pan and pot lid holder, which is universal in use and fulfills many additional functions.

BACKGROUND OF THE INVENTION

When cooking with a pot or pan, a user must periodically remove the lid to stir the items therein or to add additional ingredients thereto. The lid is typically very hot and often has splattered food and condensation thereon. A hot lid can cause permanent damage to a counter top, a table or similar support surface if placed thereon. Even if the lid is not extremely hot, condensation and food residue will drip onto the counter top Which is messy and inconvenient. Accordingly, there is a need for a device which allows a user to temporarily secure a hot or dirty pan lid eliminating the undesirable practice of placing it on a counter top.

Many pan and pot lid holders have been developed to hold a lid when it is either raised and is held on the appliance in an appliance open position or removed from the kitchen appliance and is placed onto a temporary support for use during cooking or onto a holder for long-term storage.

For example, Japanese Laid-Open Patent Application (Kokai) H7-255598 published on Oct. 9, 1995 (Inventor Narita) describes a pan lid holder which is integrally attached at an angle to the edge of the pan so that it extends radially outwardly. The holder has a longitudinal slot for insertion of a narrowed portion of the knob attached to the top of the pan lid. A disadvantage of this device is that, when the lid is placed onto the holder during cooking activity, the lid limits freedom of movement for the user. The holder of this type can be used only with the pan lid with a handle of a knob type and is not applicable for any other purposes.

U.S. Pat. No. 5,127,616 issued to Jack Carney on Jul. 7, 1992 describes a pot lid and utensil holder for holding pot lids and/or cooking utensils. The device includes a first generally planar component with separate notches, apertures, ledges or the like for supporting pot lids or cooking utensils. A second generally planar component is mounted to the first planar component to support this component and to selectively receive cooking utensils supported by the first planar component, as well as retain any drippings from the utensils.

Although the applicant of the aforementioned patent states that the device of his invention retains any dripping, it can be seen from FIG. 5 of the aforementioned patent that the position of the pan or pot lid on the holder of U.S. Pat. No. 5,127,616 does not prevent dripping to the cooking top or counter top. Furthermore, the device is unstable, :especially when supports heavy lids. It is not sufficiently universal and can support only pot or pan lids and some kitchen utensils such as spoons or knifes.

U.S. Pat. No. 5,979,673 issued in November of 1999 to P. Dooley describes a magnetic cooking utensil holder which allows a user to temporarily secure hot pan lids while cooking eliminating the undesirable practice of placing the hot and sometimes soiled lids on a counter top. The device includes a horizontal tubular magnet having a plurality of support legs pivotally attached thereto, which expand to form a tripod type support structure. A drip tray for collecting condensate or food residue adhering to the lid is removably attached to a pair of opposing support legs. A pair of opposing side arms each extending from an end of the magnet have a plurality of vertically aligned magnetic strips thereon for receiving additional cooking utensils such as knives, forks and spoons. Accordingly, whenever a user removes a lid to add ingredients or to stir the food within a pot or pan, the edge of the pan is placed within a drip tray with an opposing portion magnetically secured to the magnetic bar. The tripod type support structure allows the lid to be obliquely suspended with respect to the counter top so that any condensation or food residue adhering to the lid will easily drain into the drip tray.

A main disadvantage of the device of U.S. Pat. No. 5,979,673 is that its use is limited to holding only ferromagnetic items. Supporting of non-ferromagnetic items will be either impossible or would not provide stability of the supported items. The second disadvantage is that the residue drips from the lids to the tray, which has to be constantly cleaned from fatty substance. The third disadvantage is that the device is capable of supporting lids of a certain diameter. There is no support for lids of a small diameter and no stability for lids of a large diameter. Nothing prevents dripping from the items supported vertically on the side of the device to the counter top.

OBJECTS OF THE INVENTION

It is an object of the present invention to provide a pot and pan lid holder which is universal in its use, simple in construction, ensures stable support of pan and pot lids, prevents dripping from the lid to the cook or counter top, can be easily disassembled into parts convenient for storage and usable as additional supports for spoons, knifes, forks, kettles, pans, pots, napkins, etc., and ensures convenient access to handles of supported lids.

SUMMARY OF THE INVENTION

Provided is a universal pot and pan lid holder in the form of an open-top cylindrical body having at least one portion of its cylindrical side wall removable for access to the interior of the body from its side. The diameter of the cylindrical body should be smaller than the diameter of the lids to be supported. The removable portion has on its outer surface radial outward projections. For use as a lid support, the holder is placed onto the table or counter top with its open side up, the removable portion is removed from the cylindrical body and is placed onto the table or counter top, using the aforementioned radial projections as supports for the removed portion. When necessary, the hot or fatty pot or pan lid is placed during cooking onto the open top side of the cylindrical body with the internal (pot or pan covering) side of the lid facing up. Since the internal side of the lid faces up, dripping from the lid to the support surface is completely prevented. The cylindrical side wall may have two removable portions. The second removable portion may be located diametrically opposite to the first one and may have a flat pad on the outer side of the removable portion. When removed and placed onto the table or counter top with its flat pad up, this second removable portion may be used as a support for a kettle, pan, pot, or the like. The perforations in the bottom of the holder make it possible to use it as a strainer for washing such foods products as fruits, vegetable, berries, rice, etc.

BRIEF DESCRIPTION OF THE DRAWINGS

FIG. 8 is a top view of the holder 92 in the direction of arrow A in FIG. 7, the segments having slots cut in their side walls.

FIG. 9 is a fragmental vertical sectional view along line IX—IX of FIG. 8.

DETAILED DESCRIPTION OF THE INVENTION

Figure 1:
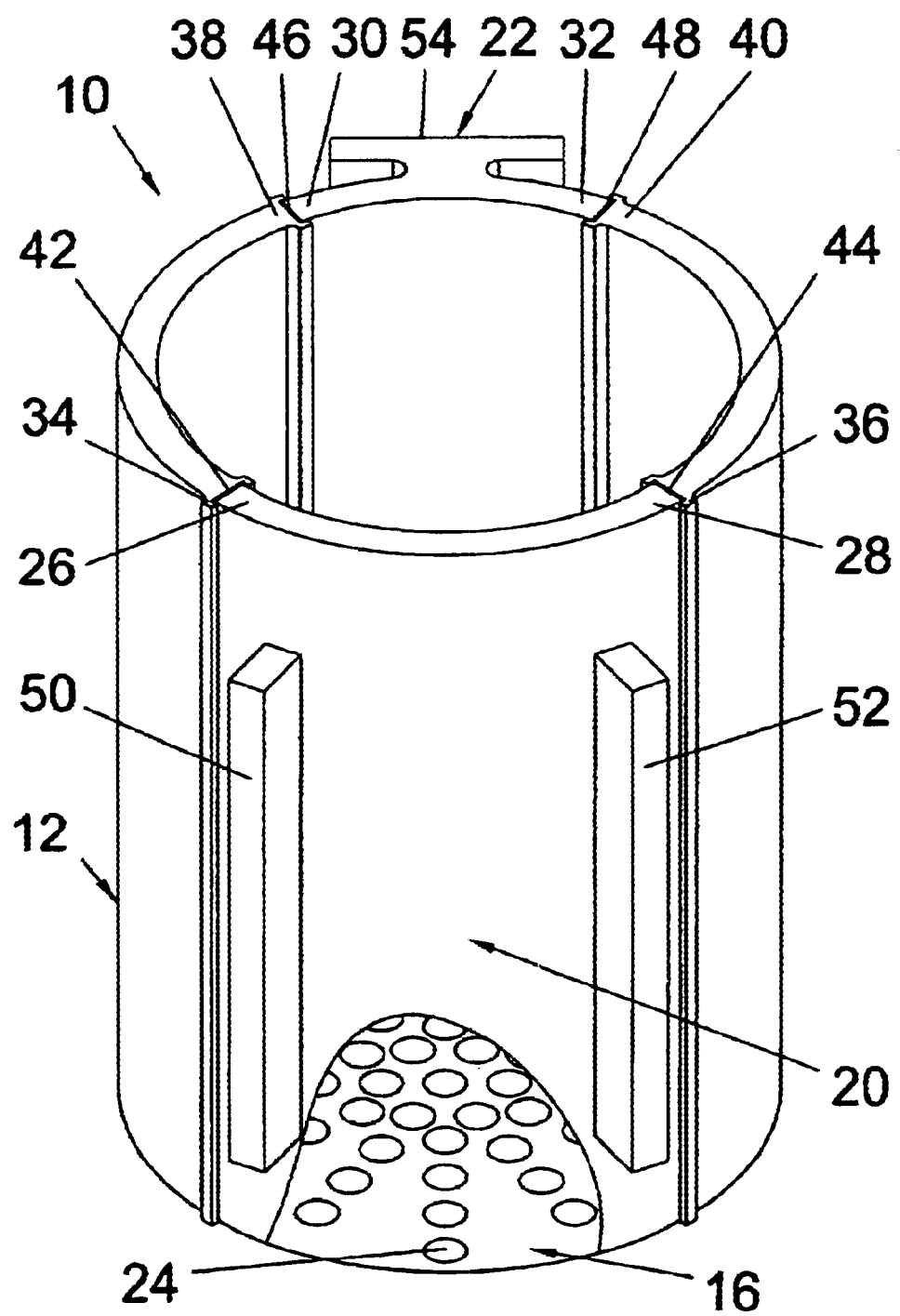
FIG. 1 is a general three-dimensional view of a universal pan and pot lid holder of the invention in an assembled state.

A general three-dimensional view of a universal pan and pot lid holder of the invention is shown in FIG. 1. As can be seen from this drawing, the holder, which in general is designated by reference numeral 10, has a cylindrical housing 12 with an open top 14 and a closed bottom portion 16. The housing has a composite structure and consists of the main portion 18 and removable segments 20 and 22 located preferably, but not necessarily, approximately opposite each other. In an assembled state the main portion 18 and the removable segments 20 and 22 form a complete cylindrical body. In the embodiment shown in FIG. 1, the main portion 18 is made integrally with the bottom portion 16. The bottom portion may have perforation 24 for use of the holder 10 in an assembled state as a, strainer.

In the areas of connection with the edges 26, 28 and 30, 32 of the removable segments 20 and 22, the edges on the segments of the main portion 18 may have respective thickened lugs 34, 36 and 38, 40 with respective vertical guide slots 42, 44 and 46, 48 for slidingly inserting the edges of the removable segments 20 and 22 and for holding them in place when the holder is assembled to the condition shown in FIG. 1.

At least one of the removable segments, e.g., segment 20, should have a width exceeding the width of the fist of a human hand. The diameter of the top opening 14 of holder 10 should be smaller than the diameters of the pan or pot lids (not shown in FIG. 1), which has to be supported by the holder.

As shown in FIG. 1, the removable segment 20 may have on its outer surface two radial outward projections 50 and 52, while the removable segment 22 may have a plate-like pad 54 attached, e.g., glued or fused to the outer surface of this segment, or molded integrally therewith. In use, the assembled pan and pot lid holder 10 of the invention may be utilized as a container for retaining some food products such as fruits or vegetable. If necessary, the holder can be used as a strainer for washing fruits or other products contained in the holder. This is possible due to the provision of the perforations 24.

Figure 2:
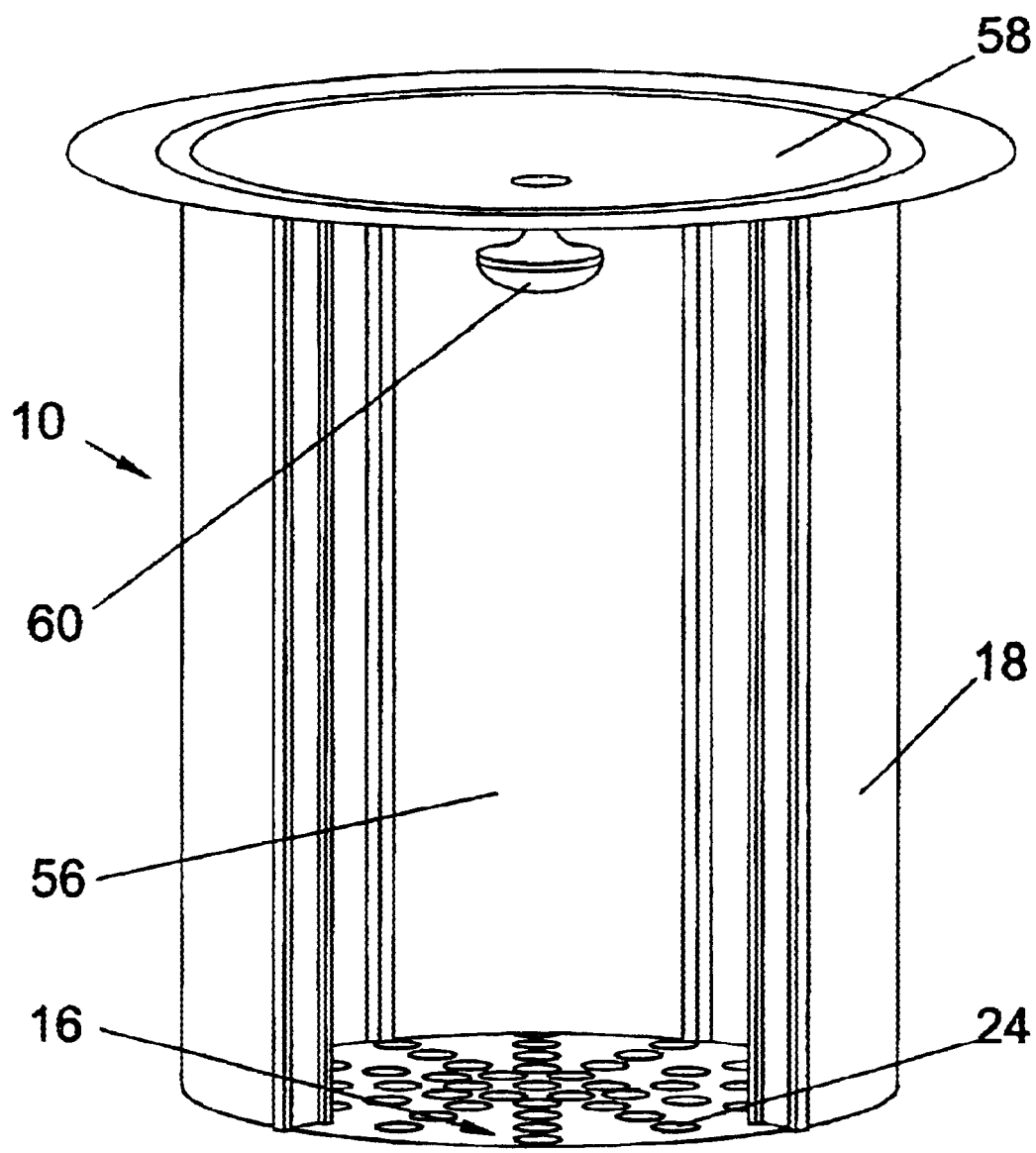
FIG. 2 is a three-dimensional view of the holder of the invention with one segment removed and a pan lid supported by the holder.

When the holder 10 is disassembled, as shown in FIG. 2, i.e., when at least one of the removable segments, e.g., the segment 20, is removed, a relatively wide vertical window 56, which extends from the bottom portion 16 to the top 14 (FIG. 1) is formed. When it is necessary, during cooking, to temporary open the pan or pot and remove the lid 58, the latter can be conveniently placed onto the top of the cylindrical main portion 18 with the edges of the lid resting on the upper edges of the main portion 16 and with the handle 60 of the lid 58 facing down. The placement of the lid, which may be hot or coated with fatty liquid, is done by inserting the hand, in which the lid is held, into the window 56, while holding the lid above the upper edge of the main portion 18, and then slowly descending the hand until the lid rests onto the upper edges of the main portion 18. Since the wet or soiled surface of the lid faces up, no dripping is possible.

Figure 3:
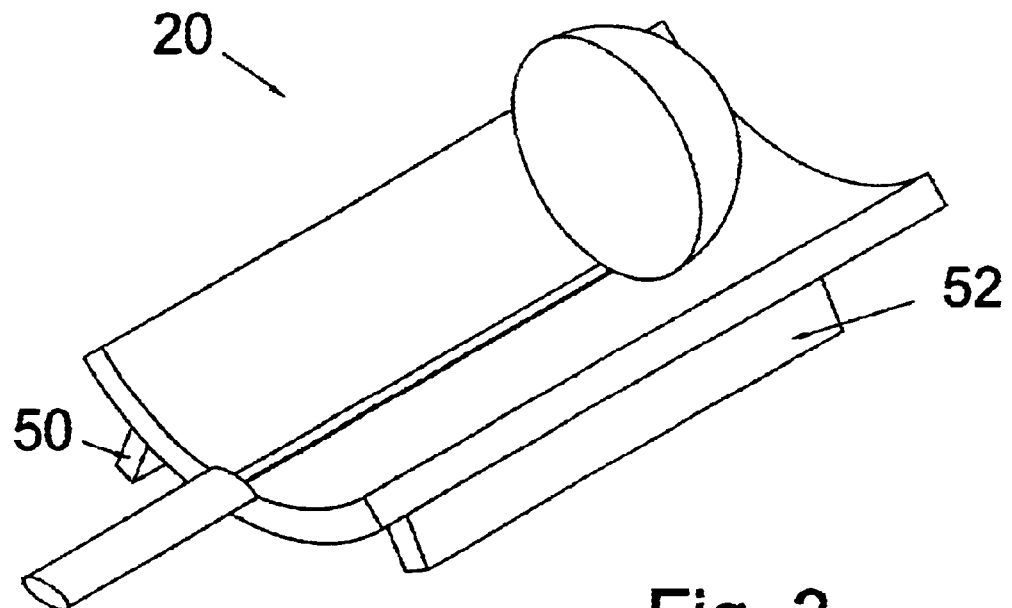
FIG. 3 a three-dimensional view of a removable segment with radial extensions as supporting legs.
Figure 4:
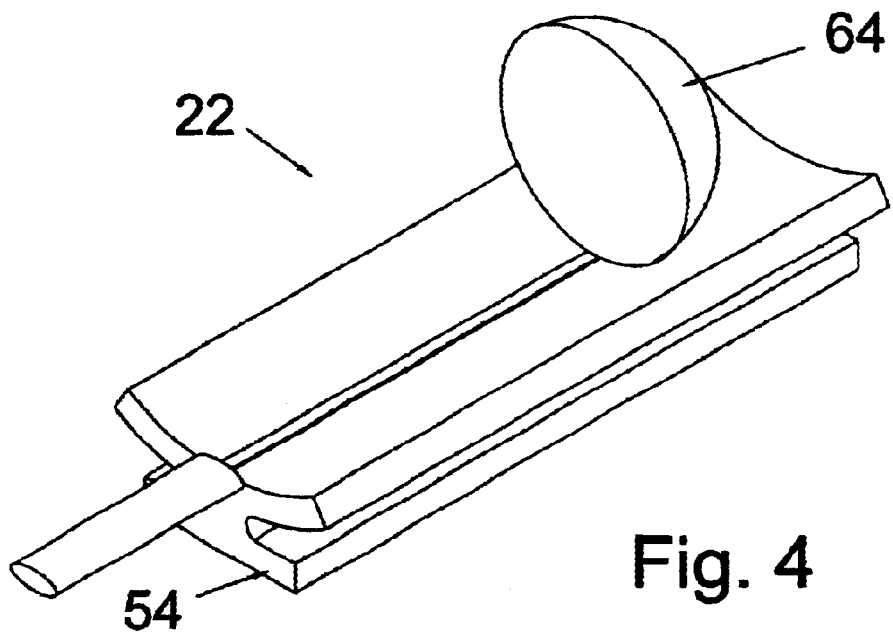
FIG. 4 a three-dimensional view of a removable segment with a flat supporting portion.

Meanwhile, as shown in FIG. 3, which is a three-dimensional view of the removable segment 20, the removed segment 20 can be placed onto the counter top or a table with the use of the projections 50 and 52 as supports, so that the inner cylindrical surface 62 of the segment can be used for supporting forks, spoons, knives, or the like. Similarly, as shown in FIG. 4, which is a three-dimensional view of the removable segment 22, the same function as described above, can be fulfilled by the removable segment 22, when it is supported by its plate-like pad 54. Alternatively, the removable segment 22 can be placed onto the kitchen top or a counter with its plate-like pad 54 up, so that it will be supported by the cylindrical portion 641, while the pad 54 can be used for supporting a pan or a kettle 66, which is shown, e.g., in FIG. 5.

Figure 6:
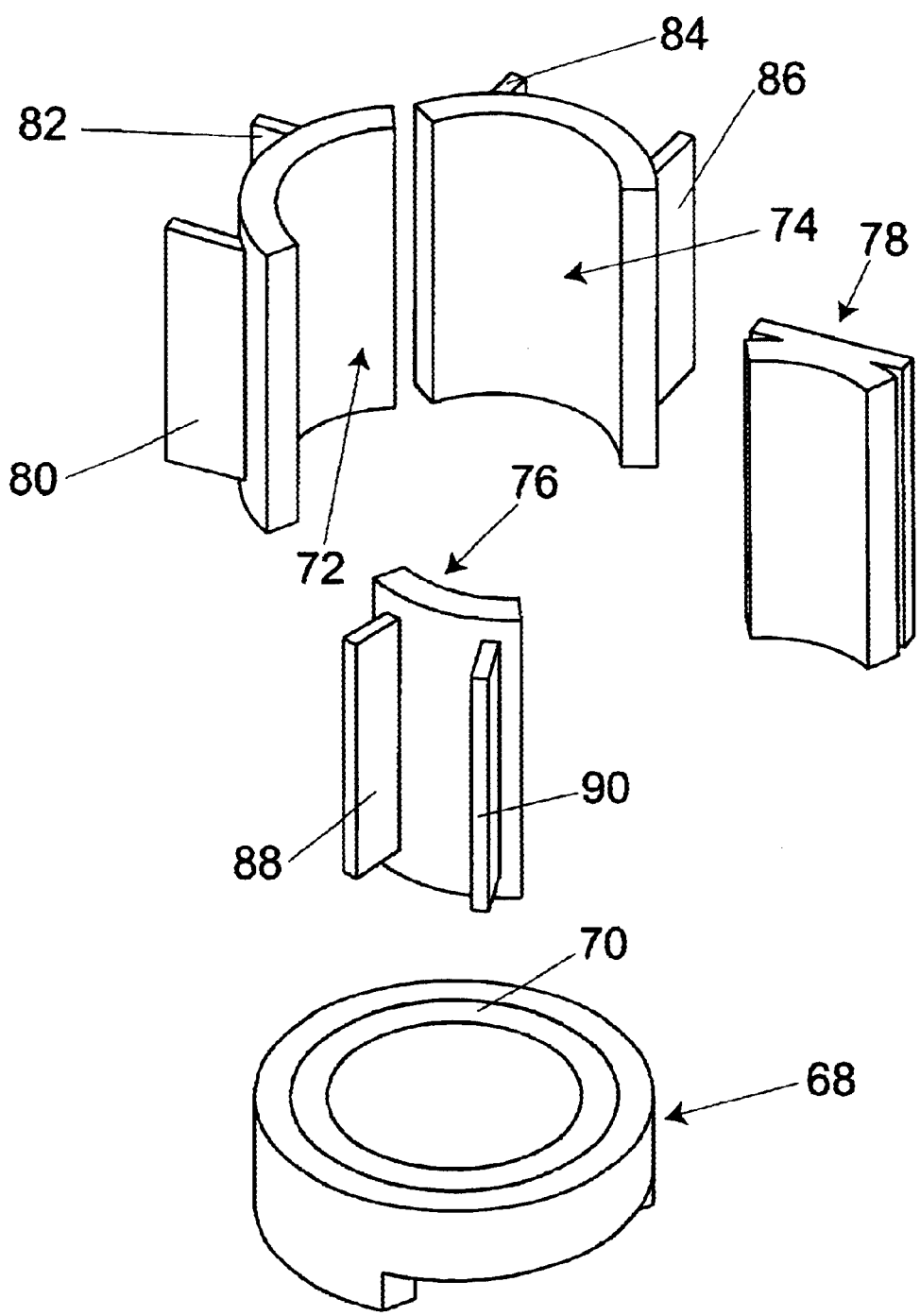
FIG. 6 is a three-dimensional exploded view of a pan and pot lid holder made in accordance with another embodiment of the invention, according to which the main portion of the holder can be further disassembled, so that the holder may consist of many separate parts.

FIG. 6 is a three-dimensional exploded view of a pan and pot lid holder made in accordance with another embodiment of the invention, according to which the main portion of the holder can be further disassembled, so that the holder may consist of several, e.g., five separate parts, i.e., a support 68 with a circular slot 70, a first cylindrical segment 72, a second cylindrical segment 74, a third cylindrical segment 76, and a fourth cylindrical segment 78. The segments are insertable into the circular slot 70 so that they can slide in this slot for forming the access window, such as window 56 of FIG. 2, of any required width. At the same time, the slot 70 should be deep enough to ensure stability of the segments in an inserted state. For example, the depth of the slot 70 may be within the range of 0.1 to 0.3 of the height of the segments.

The segments may have radial outward projections, such as projections 80, 82, 84, 86, 88, 90 on respective segments shown in FIG. 6.

Figure 7:
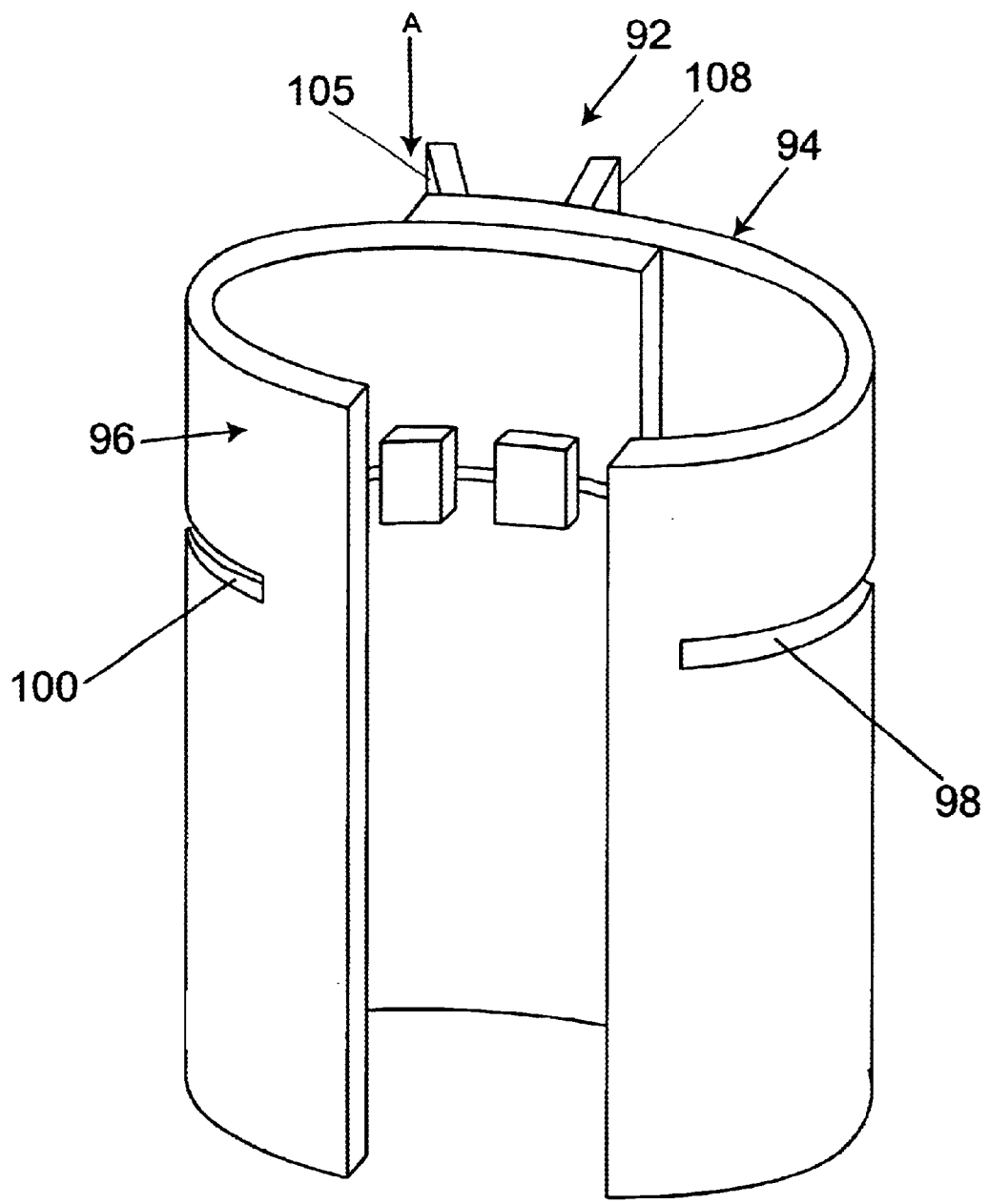
FIG. 7 is a three-dimensional view of a pan and pot lid holder that consists only of two relay moveable overlapped semi-cylindrical segments.

Still another embodiment is shown in FIG. 7, which is a three-dimensional view of a pan and pot lid holder 92 that consists only of two relatively moveable overlapped semi-cylindrical segments 94 and 96. As shown in FIG. 8, which is a top view of the holder 92 in the direction of arrow A in FIG. 7, the segments 94 and 96 have through slots 98 and 100 cut in their side walls. FIG. 9 is a fragmental vertical sectional view along line IX—IX of FIG. 8. As can be seen from FIGS. 8 and 9, the through slots are overlapped and are aligned with each other. A radial outward handle 102 is rigidly attached to the semi-cylindrical segment 94. The handle 102 has a narrow neck portion 104 that passes through both slots 98 and 100. The external part 106 of the handle 102 is wider that the slots 98 and 100. Similarly, a radial outward handle 108 is rigidly attached to the semi-cylindrical segment 96. The handle 108 has a narrow neck portion 110 that passes through the slots 98 and 100. The external part 112 of the handle 108 is wider that the neck portion 110. As a result, the segments 94 and 96 can slide over each other in circular direction while remain interconnected in a radial direction. This allows adjustment of a circular angular dimension of the holder 92 in a plane of FIG. 8.

The holder 92 can be inserted into the circular slot 70 of the support 68 shown in FIG. 6. In this case the width of the circular slot 70 should be slightly wider than the thickness of both overlapped walls of the segments 94 and 96 to ensure sliding fit of these segments in the slot 70. Alternatively, as shown in FIG. 7, when the holder 92 is extended in an, angular direction to an angle sufficient to ensure stability for its use without the,:guide slot 70 of FIG. 6, the holder 92 can be used as an independent item for supporting pan and pot lids without the use of the support 68.

Figure 10:
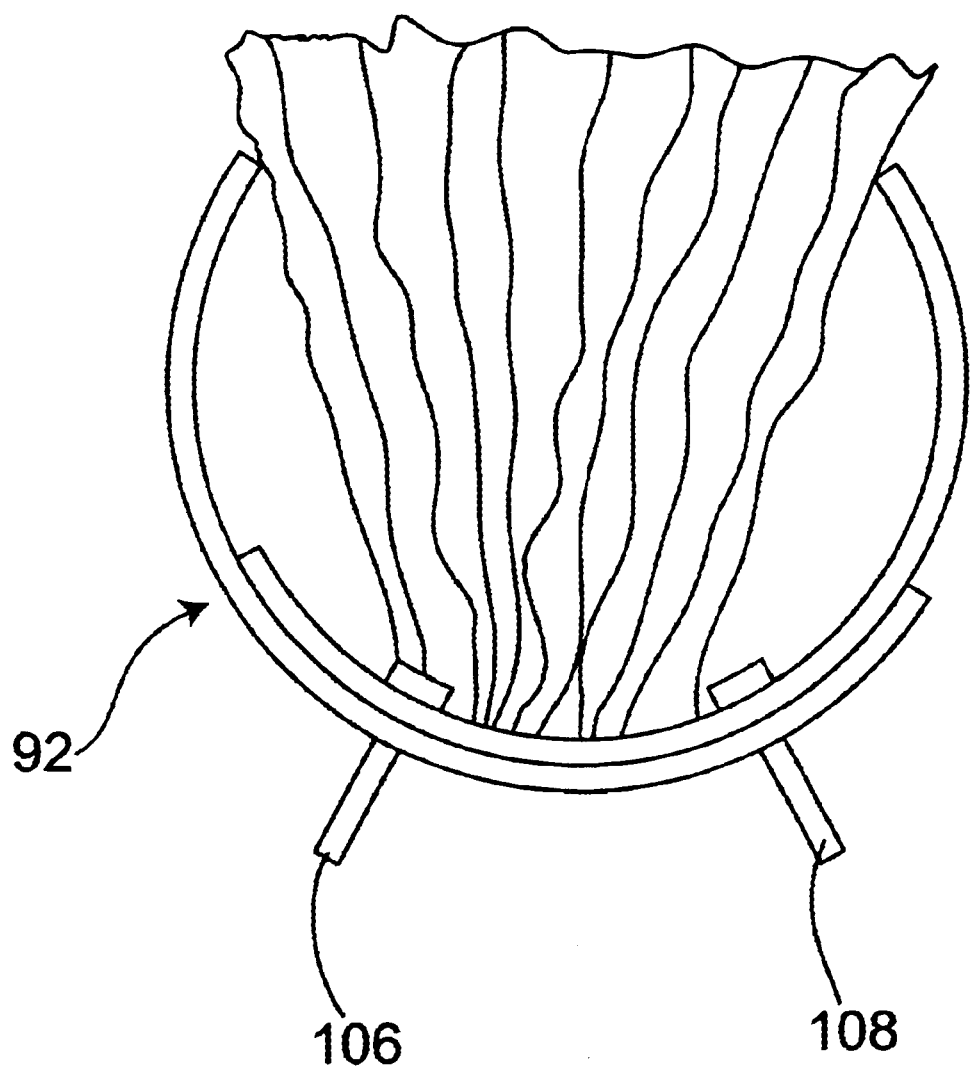
FIG. 10 is a view of the holder with segments overlapped to a maximum condition by moving the handles towards each other for supporting knives, spoons, forks, napkins, etc.

If the segments are overlapped to a maximum condition by moving the handles towards each other and the holder stands vertically, it can fulfill its main function of a pan and pot lid holder. If necessary, the holder be placed onto its handles 106 and 108 and installed in a horizontal position for supporting knives, spoons, forks, etc., or as shown in FIG. 10, for supporting napkins.

Figure 11:
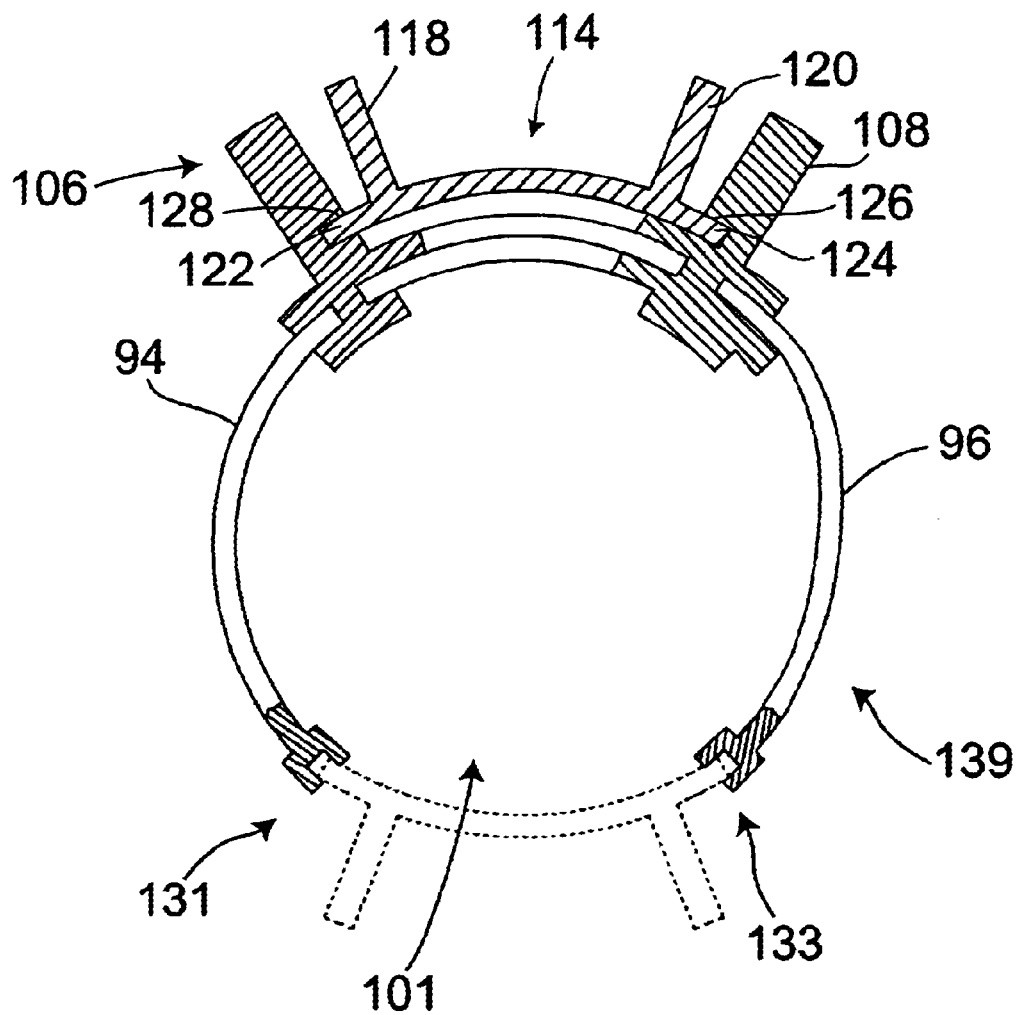
FIG. 11 is a view of the holder of FIG. 8 with means for guide slots for supporting an additional removable segment.

FIG. 11 illustrates still another embodiment, which is used for improving versatility of the device shown in FIGS. 7 to 10. In order to impart to the device other additional functions, it is suggested to provide the adjustable pan and pot lid holder 92 of FIGS. 7–10 with a removable support 114. This support comprises a cylindrical segment of the same radius as segments 94 and 96. The support or segment 114 has legs 118, 120 and side edges 122, 124. The side edges 122, 124 are used for insertion into recesses 126, 128 formed in the portions of handles 106,108 of the holder 92 which project outside of the holder 92.

Figure 5:
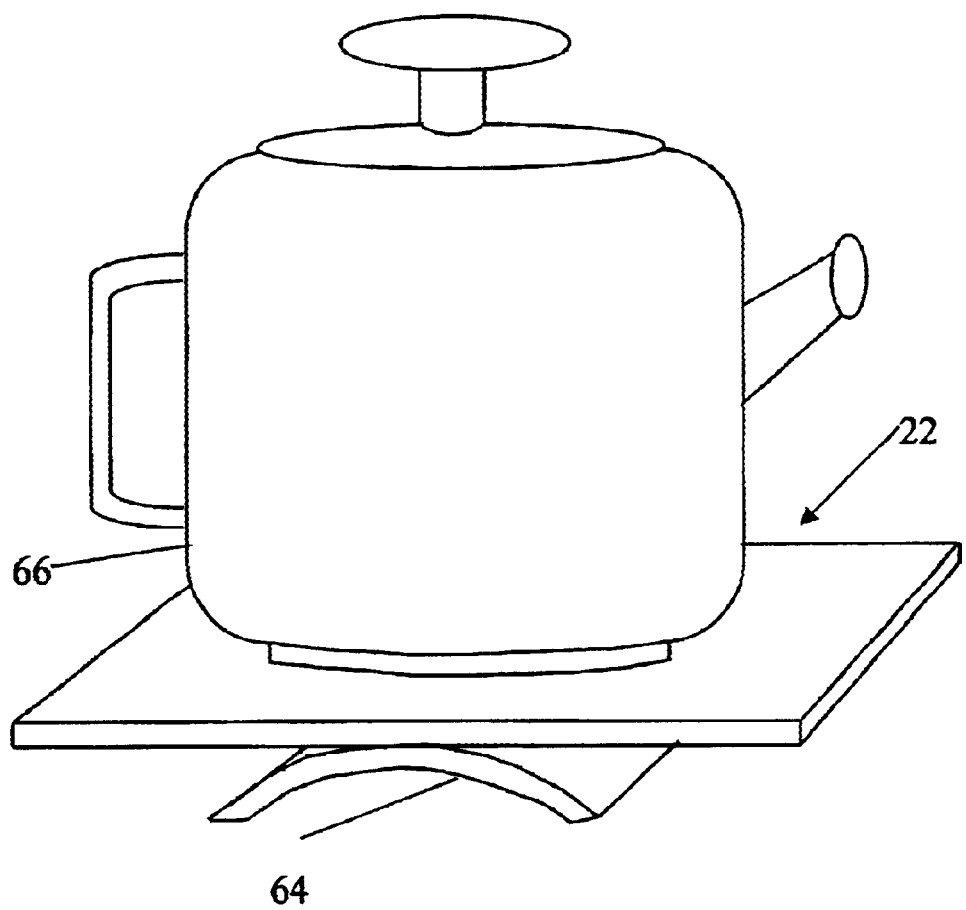
FIG.5 is a three-dimensional view of al removable segment of FIG. 4 in a position with its flat side facing up for supporting kettles, pans, pots, etc.

In use, the pan and pot lid holder 92 is utilized as described earlier with reference to FIGS. 7–10, and the removable support 114 is utilized as devices shown in FIGS. 3, 4, and 5. It is understood that by moving the segments 94 and 96 in circumferential direction with respect to each other, it is possible to adjust the width of an access opening 101 (FIGS. 7 and 11) for matching to the size of the user's hand. It is understood that in the position of maximal overlapping of both segments 94 and 96, the holder will occupy the minimal space convenient for storage of the device.

It advantageous to attach the removable support 114 (FIG. 11) to the holder in the aforementioned storage position of the segments. The distance between the ends of the aforementioned side edges 122 and 124 of the removable support 114 is equal to the distance between the recesses 126 and 128 in the aforementioned storage conditions of the segments.

If necessary, the facing edges of the,cylindrical segments 94 and 96 may have thickened lugs 131 and 133 (FIG. 1) With respective recesses 135 and 137. The recesses 135 and 137 have the same configuration as the recesses 126 and 128. Therefore, when it is required to convert the holder 92 into a complete cylindrical body, the cylindrical segments 94 and 96 are moved circumferentially to such a distance that the edges 122 and 124. of the removable support 114 can be inserted into the recesses 131 and 1133. By inserting the lower edge of the thus-formed cylindrical body into 70 the circular slot 70, it is possible to covert the holder 92 into a cylindrical container with a closed bottom and open top. In FIG. 11, the a position of the removable support inserted the recesses 131 and 133 for forming a complete cylindrical body 139 is shown by broken lines. It is understood that in this case, the distance between the facing edges 131 and 133 of the cylindrical segments 95 and 96 in their minimal overlapped position, i.e., in the most extended position, should not exceed the width of the removable support 114.

Figure 12:
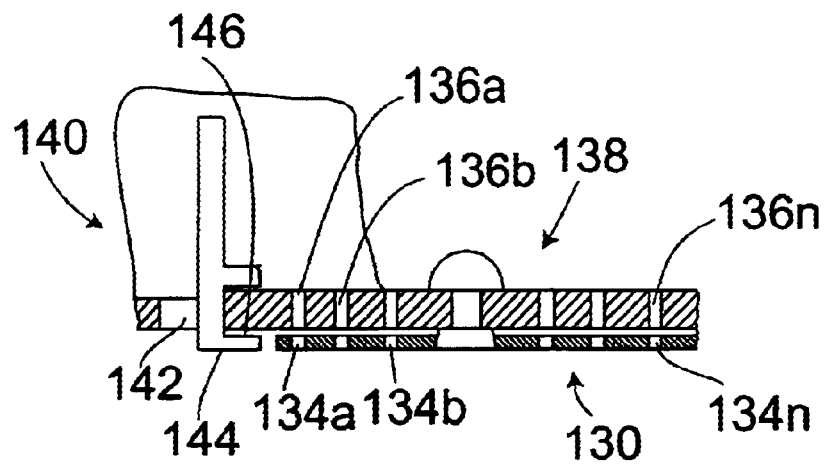
FIG. 12 illustrates a fragmental view of the holder provided with a rotatable perforated disk for opening and closing perforations of the strainer.

FIG. 12 illustrates another embodiment of the invention, which is a modification of the device shown in FIGS. 1–6 and differs from it by a provision of a rotatable perforated disk 130. This disk is rotated on an axle 132 and has perforations 134a, 134b, . . . 134n, which are aligned with respective perforations 136a, 136b, . . . 136n formed in the bottom portion 138 of the pan and pot lid holder 140. The holder 140 is in general the same as that shown in the previous embodiments. When it is necessary to use the interior of the holder 140 for holding fruits, vegetables, rice, or the like, the disk 130 is rotated to a position in which the perforations 136a, 136b, . . . 136n of the bottom portions 138 are closed by non-perforated areas of the disk, and when it is necessary to use the holder 140 as a strainer, the disk 130 is rotated to the position, in which perforations of the disk are aligned with perforations: of the bottom portion 138.

Furthermore, the removable segments, such as segments 72, 74, 76, 78 shown in FIG. 6, can be attached to the bottom portion 138 in a manner shown in FIG. 12. In this drawing the removable segment is designated by reference numeral 140. The bottom portion 138 has a circular slot 142, while the lower edge of the segment 140 has a projection 144 having a length equal to or slightly shorter than the length of the slot 142 and a U-shaped slot 146 having a width equal to or slightly wider than the thickness of the bottom portion 138.

For attachment of the segment 140 to the bottom portion 138 of the holder, the projection 144 is inserted into the circular slot 142 of the bottom portion 138 to a position, in which the slot 146 is aligned with the bottom portion 138. The segment is then moved radially inwardly so that the adjacent part of the bottom portion 138 is inserted into the slot 146 of the projection 144. In other words, the projection 144 and the slot 142 form a kind of a bayonet connection.

Thus, it has been shown that the invention provides a pot and pan lid holder which is universal in its use, ensures stable support of pan and pot lids, simple in construction, prevents dripping from the lid to the cook or counter top, can be easily disassembled into parts convenient for storage and usable as additional supports for spoons, knifes, forks, kettles, pans, pots, etc., and ensure convenient access to handles of supported lids.

Although the invention has been shown and described with reference to specific embodiments, it is understood that these embodiments do not limit the application of the invention and that any changes and modifications are possible, provided they do not depart from the scope of the patent claims. For example, such parts of the segments as radial projections 50, 52, pad 54, etc., can be integrally molded, glued, or mechanically connected to the segments. The number of removable segments shown in the embodiment of FIG. 6 may be different that shown in this drawing. The segments can be made from different materials such as metal or heat-resistant glass or plastic. The holder housing may have a cross-section different from circular.

What is claimed is:

1. A universal pan and pot lid holder comprising at least a first member, a second member, said first member and said second member having means for moveably connecting said first member and said second member to each other, at least one of said first and said second members having means for imparting an additional function to said universal pan and pot lid holder, said holder having at least one open end and a side wall with an opening for access, to the interior of said holder through said opening, wherein said first member and said second member each comprises a cylindrical segment which is a part of a cylindrical body having a cylindrical surface, an upper edge, and a lower edge, said first and said second cylindrical segments each having a through slot, said through slots of said first cylindrical segment and of said second cylindrical segment being aligned with each other, said first cylindrical segment having a first radial outward projection which projects outside said holder through said through slot of said second cylindrical segment, while said, second cylindrical segment having a second radial outward projection which projects outside said holder through said through slot of said first cylindrical segment, at least one of said cylindrical segment having means for preventing disconnection of said segments in a radial direction, so that said first and second cylindrical segments are moveable with respect to each other in a circular direction but prevented from movement with respect to each other in the radial direction.

2. The holder of claim 1, further provided with a cylindrical support which has a circular slot into which said holder can be inserted with said lower edges of said cylindrical segments, so that said open end being located on the side opposite to said cylindrical support, said circular slot serving for guiding said lower edges when said first and said second cylindrical segments are moved in the circumferential direction with respect to each other.

3. The holder of claim 2, further provided with a removable support member comprising a plate with legs and side projections, said first radial outward projection and said second radial outward projection have portions that project outside said holder, said portions having recesses for insertion of said projections.

4. The holder of claim 3, wherein said first member and said second member are moved in said circular direction between a first position in which said opening for access to the interior of said holder has a maximum value and a second position in which said opening for access to the interior of said holder has a minimum value, in said second position the distance between said projections being equal to the distance between said recesses, so that said projections can be inserted into said recesses.

5. The holder of claim 4, wherein said plate comprises an additional cylindrical segment substantially of the same radius as the radius of said first member and of said second member, said first member and said second member having facing edges between which opening for access to the interior of said holder is formed, said facing edges having recesses, said minimum value of said opening for access to the interior of said holder is smaller than said distance between said projections of said removable support member, so that said facing edges can be adjusted to a position, in which s said projections of said removable support member can be inserted into said facing recesses to form a together with said first member and said second member a complete closed cylindrical body.

* * * * *